Figure 1:
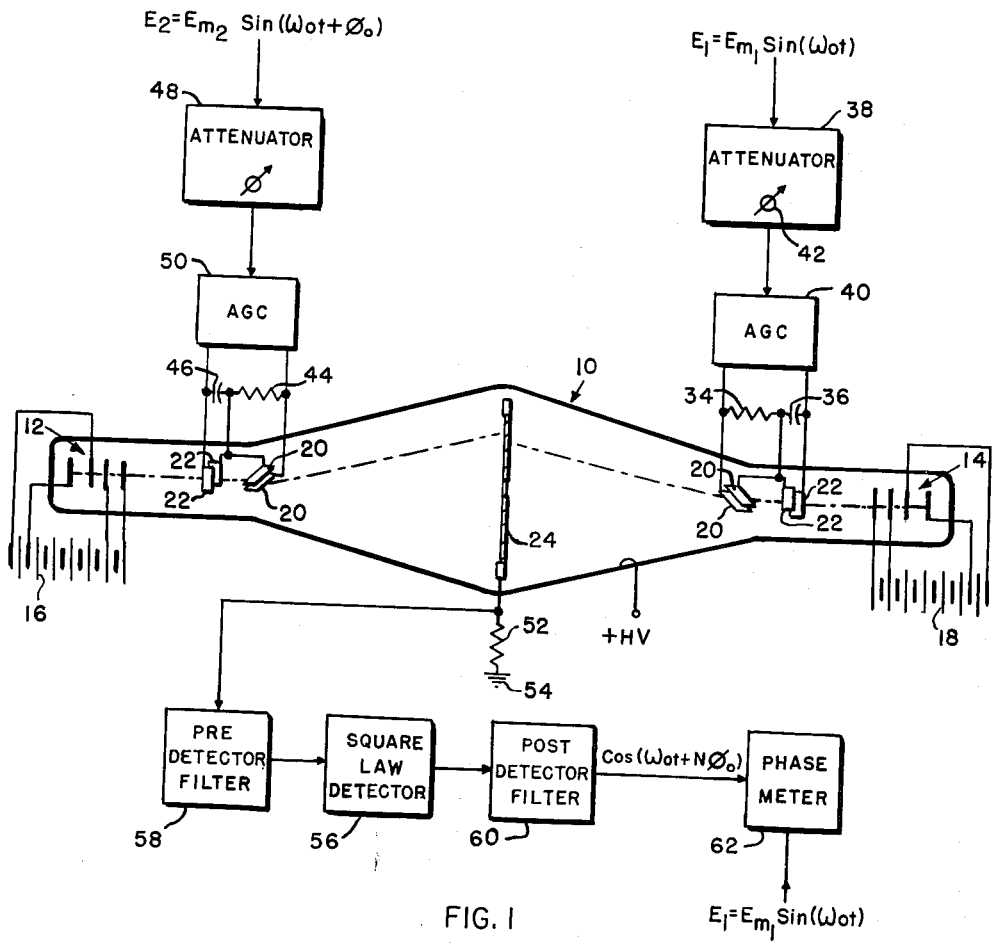

July 31, 1956  R. J. GALE  2,757,337
CATHODE RAY PHASE MULTIPLIER
Filed March 31, 1953
2 Sheets-Sheet 1

INVENTOR.
RICHARD J. GALE
BY
Harry M. Saragovitz
Attorney

July 31, 1956

R. J. GALE 2,757,337

CATHODE RAY PHASE MULTIPLIER

Filed March 31, 1953

2 Sheets-Sheet 2

INVENTOR.
RICHARD J. GALE
BY
Harry M. Saragovitz
Attorney

United States Patent Office 2,757,337
Patented July 31, 1956

2,757,337
CATHODE RAY PHASE MULTIPLIER

Richard J. Gale, Belmar, N. J., assignor to the United States of America as represented by the Secretary of the Army Application March 31, 1953, Serial No. 346,055

5 Claims. (Cl. 324—85)

(Granted under Title 35, U. S. Code (1952), sec. 266)

The invention disclosed herein may be manufactured and used by or for the Government for governmental purposes, without the payment of any royalty thereon.

This invention relates to phase indicator systems and more particularly to a phase multiplier device employing a cathode ray frequency conversion tube.

One of the major factors presently inhibiting the accuracy of position determination by means of C-W electronic navigational systems is the instrumental precision required in the employed phase measuring system. The accurate measurement of phase shifts at high radio frequencies has been very difficult and complicated up to the present time. However, it is well known that by applying phase multiplying techniques to an indicator of fixed precision, it is possible to increase the precision of the phase measurement N times, where N is the integral number of times the phase has been multiplied. The display of the phase difference $N\theta$ on a phase indicator formerly used to display the phase angle $\theta$ will result in an effective vernier subdivision of N. Heretofore, the prior art practice to achieve this result involved the use of circuits to provide calibrated phase shifters, generated transients and rectified signals. At relatively high frequencies such circuits become highly critical and complex, difficult to build, and usually require careful adjustment and manipulation.

It is accordingly an object of the present invention to provide an improved phase multiplier device having greater precision of phase measurement.

It is an additional object of the present invention to provide an improved phase multiplier device of the cathode-ray tube type.

It is yet another object of the present invention to provide a high order of phase multiplication in a single stage with a minimum of amplitude phase modulation and distortion.

In accordance with the present invention the phase multiplier includes a duplex cathode-ray device having means for producing axially aligned mutually opposing electron beams. A first radio-frequency signal is applied to one of the electron beams to deflect said beam in a first circular path. A second radio-frequency signal, substantially of the same angular frequency as said first signal but differing in phase therefrom by a prescribed angle, is applied to the other electron beam to deflect said other beam in a second circular path. A target electrode normal to the axes of the beams is provided for simultaneously intercepting the circular beams whereby the first circular beam generates a first target current having a frequency ($N-1$) times that of said first signal, and said second circular beam generates a second current having a frequency N times that of said second signal, N being an integer. Means are included for additively combining said first and second generated currents. A detector responsive to the combined currents is provided to produce at least one output signal component having a frequency substantially equal to the angular frequency of the first signal and having a discrete angular phase difference N times the prescribed angular phase difference. Also included are filter means provided for passing only said one component frequency and means for indicating the multiplied angular phase difference with respect to the first radio signal.

Figure 2:
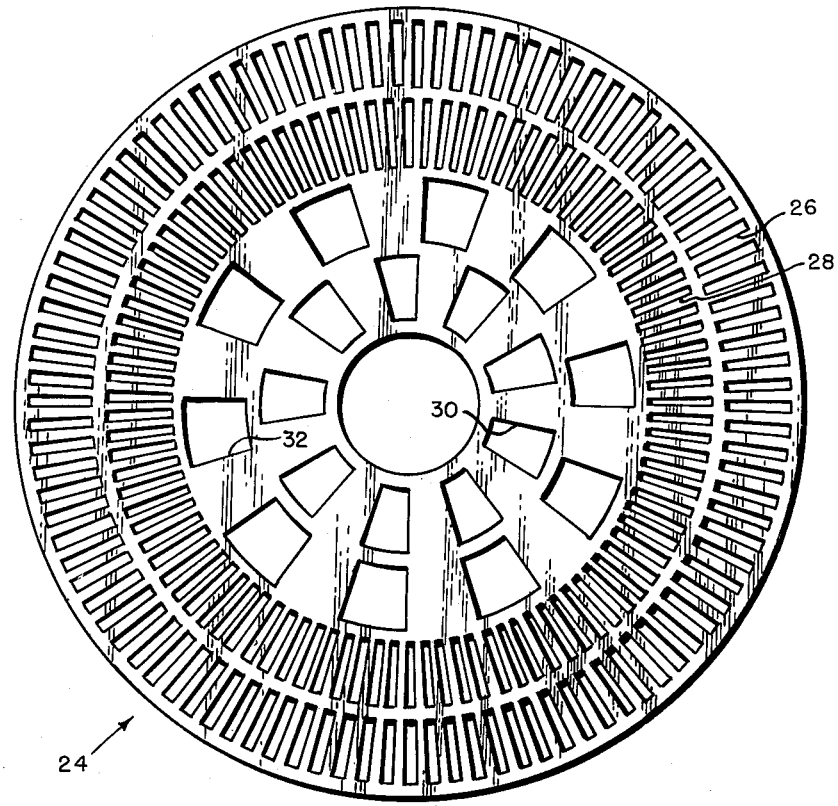

For a better understanding of the present invention together with other and further objects thereof, reference is had to the following description taken in connection with the accompanying drawing in which:

Fig. 1 is a simplified schematic presentation of a phase multiplier employing, in accordance with the invention, a cathode-ray device; and Fig. 2 is a plan view of the frequency conversion target electrode in the cathode-ray device shown in Fig. 1.

Referring now more particularly to Figs. 1 and 2, there is represented a phase multiplying device in accordance with the invention comprising a duplex type of cathode-ray tube 10 having two identical electron gun structures 12 and 14 of conventional design for producing two opposing axially aligned electron beams respectively energized by batteries 16 and 18. The normal or axial direction of each of the electron beams is indicated by the dot-dash line. Included in the tube adjacent each of the electron gun structures are conventional vertical deflection plates 20, 20, and conventional horizontal deflection plates 22, 22. Located in a plane normal to the common axial direction of both electron beams is a frequency conversion target electrode 24 comprising a thin nickel-plated copper disc having alternate wedge-shaped spokes and congruent apertures arranged in concentric annular rings as shown in Fig. 2. The relationship between the number of spokes in any pair of adjacent annular rings is such that if one annular ring includes N wedge-shaped spokes, the adjacent annular ring will include ($N+1$) or ($N-1$) wedge-shaped spokes, N being an integer. For example, in the illustration of Fig. 2, the outermost ring 26 of target electrode 24 includes 100 wedge-shaped spokes, while the next adjacent ring 28 comprises 99 wedge-shaped spokes. Similarly, the innermost ring 30 and adjacent ring 32 respectively comprise 9 and 10 wedge-shaped spokes. As will hereinafter be explained, for the purpose of the present invention only one pair of adjacent annular rings may be utilized at any one time. Frequency conversion target electrode 24 may be rigidly supported in position within cathode-ray tube 10 by any suitable means well known in the art.

Two input radio-frequency signals having the same angular frequency $\omega_0$ and phase difference $\theta_0$ are represented respectively by $E_1$ and $E_2$. If $E_1$ is considered the reference input signal, then the two input radio-frequency signals may be conventionally represented by:

$$E_1 = E_{m_1} \sin(\omega_0 t) \quad (1)$$

and $$E_2 = E_{m_2} (\sin \omega_0 t + \theta_0) \quad (2)$$

The axially opposing beams in cathode-ray tube 10 are caused to trace circular paths over frequency conversion target electrode 24; one circular trace impinging on an annular ring having N wedge-shaped spokes and the other circular trace impinging on the adjacent annular ring having ($N-1$) wedge-shaped spokes. Reference signal $E_{m_1} \sin \omega_0 t$ supplies waves of sinusoidal form which are applied to series connected resistance 34 and capacitance 36 through attenuator 38 and automatic gain control circuit 40. Resistance 34 and capacitor 36 serve as a phase splitter for obtaining quadrature voltage components of reference signal $E_{m_1} \sin \omega_0 t$, which components are applied to one set of deflection plates 20 and 22 associated with electron gun 14. As is well known, if sinusoidal voltages in phase quadratures are applied to deflection plates 20 and 22, the beam will scan frequency conversion target electrode 24 along a circular path at a rate which will be dependent on the frequency of the applied sinusoidal voltage. The magnitude of the sinusoidal voltage applied to phase splitter comprising resistor 34 and capacitor 36 may be adjusted by gain control knob 42 of attenuator 38 so that the circular trace of the beam from electron gun 14 will follow a circular path having a diameter equal to the diameter of the annular ring 28 having ($N-1$) wedge-shaped spokes. Automatic gain control circuit 40 is employed to prevent any undesirable jitter of the circular trace due to any voltage variations which may be present. Attenuation and automatic gain control circuits of the type represented by block units 38 and 40 are now so well known in the art that a description of the electronic circuits of which it is comprised and their operation is deemed unnecessary.

In a similar manner, the signal $E_{m_2}(\omega_0 t + \theta_0)$ is applied to series connected resistance 44 and capacitor 46 through attenuator 48 and the automatic gain control circuit 50 to obtain quadrature voltage components of signal $E_2$. These components are applied to the set of deflection plates 20 and 22 associated with electron gun 12 to generate a circular trace which will follow a circular path having a diameter equal to the diameter of annular ring 26 having N wedge-shaped spokes. If the amplitudes of the input signals $E_1$ and $E_2$ are insufficient in magnitude to produce circular paths having diameters substantially equal to the diameters of the outermost annular rings 26 and 28 as described above, then the diameter of the respective circular paths may be adjusted by means of attenuators 38 and 48 to sweep the innermost pair of annular rings 30 and 32 of target electrode 24 consisting of the 9 and 10 wedge-shaped spokes. It is to be understood, of course, that magnetic deflection may be utilized instead of electrostatic deflection to generate circular traces and that the quadrature phase components of the sweep voltages may be derived by any other suitable means such as, for example, a Sickles coil. Any suitable means may be utilized to provide a visible trace for making adjustments of the circular sweeps. For example, the outermost and innermost peripheries of electrode 24 may be coated with Willemite to provide such a visible trace. Also, the spacing between adjacent annular rings may be coated with Willemite to further aid in visibly checking the position of the circular sweeps.

At this point, it would be advisable to discuss the currents generated in target electrode 24 by the two circular beams. Assuming that the wave $E_{m_1} \sin \omega_0 t$ circularly sweeps one of the electron beams across the section of target electrode 24 having ($N-1$) wedge-shaped spokes, and that the wave $E_{m_2}(\sin \omega_0 t + \theta_0)$ sweeps the other beam circularly across the section of target electrode 24 having N wedge-shaped spokes, then the frequency of the current $i_1$ generated in target electrode 24 by $E_1$ is ($N-1$) times the sweep frequency, and the frequency of the current $i_2$ generated in target electrode 24 by $E_2$ is N times the sweep frequency. These two currents may be represented by the following equations:

$$i_1 = K_1 \sin (N-1)\omega_0 t \quad (3)$$

and $$i_2 = K_2 \sin (N\omega_0 t + N\theta_0) \quad (4)$$

where the constants $K_1$ and $K_2$ are, in general, governed by the intensity (current) and cross-section (focus) of the scanning electron beams.

If a linear superposition of the two currents established in the target electrode be assumed, the total current may be represented by $$i_T = K_1 \sin (N-1)\omega_0 t + K_2 \sin (N\omega_0 t + N\theta_0) \quad (5)$$

The total sinusoidal current of Equation 5 is additively applied to a load resistor 52 which connects target electrode 24 to ground indicator at 54. For explanation purposes, load resistor 52 may be designated $R_L$. Thus, the voltage developed across $R_L$ due to the current of Equation 5 may be represented by $$V_{R_L} = K_1 R_L \sin (N-1)\omega_0 t + K_2 R_L \sin (N\omega_0 t + N\theta_0) \quad (6)$$

The voltage output developed across resistor 52 in accordance with Equation 6 is fed to a non-linear detector 56 through a low-pass or predetection filter 58. Predetection filter 58 is adjusted to remove any harmonics or cross-modulated components present as a result of the frequency multiplication process and it thus may be assumed that only the frequencies shown in Equation 6 are applied to non-linear detector 56. Non-linear detector 56 is chosen to be of the square law type and will effectively serve to square the wave (6) to thereby produce a current $i_3$ having the form $$i_3(t) = a_1 K_1 R_L \sin (N-1)\omega_0 t + a_1 K_2 R_L \sin (N\omega_0 t + N\theta_0) + a_2 K_1^2 R_L^2 \sin^2 (N-1)\omega_0 t + a_2 K_2^2 R_L^2 \sin^2 (N\omega_0 t + N\theta_0) + 2a_2 K_1 K_2 R_L^2 \sin (N-1)\omega_0 t \sin (N\omega_0 t + N\theta_0) \quad (7)$$

where $a_1$ and $a_2$ are evaluated from the derivative of the defined function. By trigonometric manipulation it can be shown that the following seven different frequencies are in the output of square-law detector 56.

1. $\dfrac{a_2 R_L^2}{2}(K_1^2 + K_2^2)$

2. $a_1 K_1 R_L \sin (N-1)\omega_0 t$

3. $\dfrac{a_2 K_1^2 R_L^2}{2} \cos 2(N-1)\omega_0 t$

4. $a_2 K_1 K_2 R_L^2 \cos (\omega_0 t + N\theta_0)$

5. $a_1 K_2 R_L \sin (N\omega_0 t + N\theta_0)$

6. $a_2 K_1 K_2 R_L^2 \cos [(2N-1)\omega_0 t + N\theta_0]$

7. $\dfrac{a_2 K_2^2 R_L}{2} \cos 2(N\omega_0 t + N\theta_0)$

It is apparent that the cosine term representing component (4) above is of fundamental angular frequency $\omega_0 t$ and has a phase angle $N\theta_0$ while the remaining terms, except term 1 which is a direct-current component, comprise some multiple of the fundamental angular frequency $\omega_0 t$. The frequency outputs of non-linear detector 56 is applied to phase meter 62 through a band-pass, or postdetector filter 60 which removes all frequency components listed above except the desired signal as represented by component (4). It is to be understood, of course, that the overall bandpass of filter 60 is sufficiently broad to minimize any phase shift. The direct current term represented by component (1) above, may be conventionally removed by means of a simple coupling condenser. As shown, the input reference voltage $E_1 \sin \omega_0 t$ is also applied to phase meter 62 to compare the phase difference of the phase multiplied signal and that of the reference signal as represented by component (4).

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for multiplying the phase difference between a reference radio-frequency signal and a discrete radio-frequency signal having substantially the same angular frequency as said reference signal but differing in phase therefrom by a prescribed angle, comprising a duplex cathode-ray device having means for producing axially aligned mutually opposing electron beams, means responsive to said reference frequency signal for deflecting one of said beams in a first circular path, means responsive to the said discrete radio-frequency signal for deflecting the other of said beams in a second circular path, means within said cathode-ray device intermediate said circular beam producing means and normal to said axially aligned beams for intercepting each of the circular beams to simultaneously generate a first current having a frequency $(N-1)$ times said reference signal, and a second current having a frequency $N$ times said discrete radio-frequency signal, $N$ being an integer, means coupled to the intercepting means for additively combining said first and second generated current to derive an output voltage, a non-linear detector responsive to said combined output voltage for producing at least one signal component having a frequency substantially equal to said angular frequency and having an angular phase difference $N$ times said prescribed angular phase difference, filter means coupled to the output of said detector and adapted to pass responsive only the frequency of said one signal component, and means for indicating the multiplied angular phase difference with respect to said reference signal.

2. Apparatus for multiplying the phase difference between a reference radio-frequency signal and a discrete radio-frequency signal having substantially the same angular frequency as said reference signal but differing in phase therefrom by a prescribed angle, comprising a duplex cathode-ray device having means for generating axially aligned mutually opposing electron beams, means in circuit with one of said electron beams and responsive to said reference radio-frequency signal for deflecting one of said beams in a circular path having a first predetermined diameter, means in circuit with the other of said electron beams and responsive to said discrete radio-frequency signal for deflecting said other beam in a circular path having a second predetermined diameter, means within said cathode-ray device intermediate said circular beam producing means and normal to the axes of said beams for simultaneously intercepting said circular beams whereby the frequency of said reference signal is multiplied $(N-1)$ times and the frequency of said discrete signal is multiplied $N$ times, $N$ being an integer, means coupled to said intercepting means for additively combining said frequency multiplied signals to generate an output voltage, means responsive to said output voltage for detecting said combined frequency multiplied signals whereby at least one output component of said detecting means includes a signal having a frequency substantially equal to the frequency of said reference signal and having an angular phase difference $N$ times said prescribed angular phase difference with respect to said reference signal frequency, filter means responsive to the output of said detecting means and adapted to only pass the frequency of said one output component wave signal, and means for indicating the multiplied angular phase difference with respect to said reference signal.

3. The apparatus in accordance with claim 1 wherein said detector is a square-law detector.

4. The apparatus in accordance with claim 1 wherein the intercepting means comprises a target electrode having at least two concentric rings each having alternate wedge-shaped spokes and congruent apertures, one of said rings having $N$ wedge-shaped spokes and the other of said rings having $N-1$ wedge-shaped spokes, $N$ being an integer.

5. Apparatus for multiplying the prescribed phase difference between a reference signal voltage and a discrete signal voltage having substantially equal angular frequencies comprising a cathode ray tube having means for producing two discrete electron beams, means responsive to each of said signals for rotating each of said beams along discrete circular paths at said angular frequency, means within said cathode ray tube and spaced from said electron beam producing means for intercepting said circular beams whereby two discrete currents are simultaneously generated having respective frequencies of $N$ and $N-1$ times of said angular frequency, a load resistor connected to the intercepting means to develop an output voltage proportional to the sum of the multiplied current frequencies, a non-linear detector responsive to said output voltage for producing at least one current signal component having a frequency substantially equal to said angular frequency and having an angular phase difference $N$ times said prescribed phase difference, a filter coupled to the output of said detector and adapted to pass only the frequency of said one component, and means for indicating the multiplied angular phase difference with respect to said reference signal voltage.

References Cited in the file of this patent

UNITED STATES PATENTS

| | | |
|---|---|---|
| 1,932,637 | Richardson | Oct. 31, 1933 |
| 2,423,103 | Koechlin | July 1, 1947 |